(No Model.)
J. D. BRAUN & K. LANDSCHNEIDER.
SHAFT SUPPORT FOR VEHICLES.
No. 391,112. Patented Oct. 16, 1888.
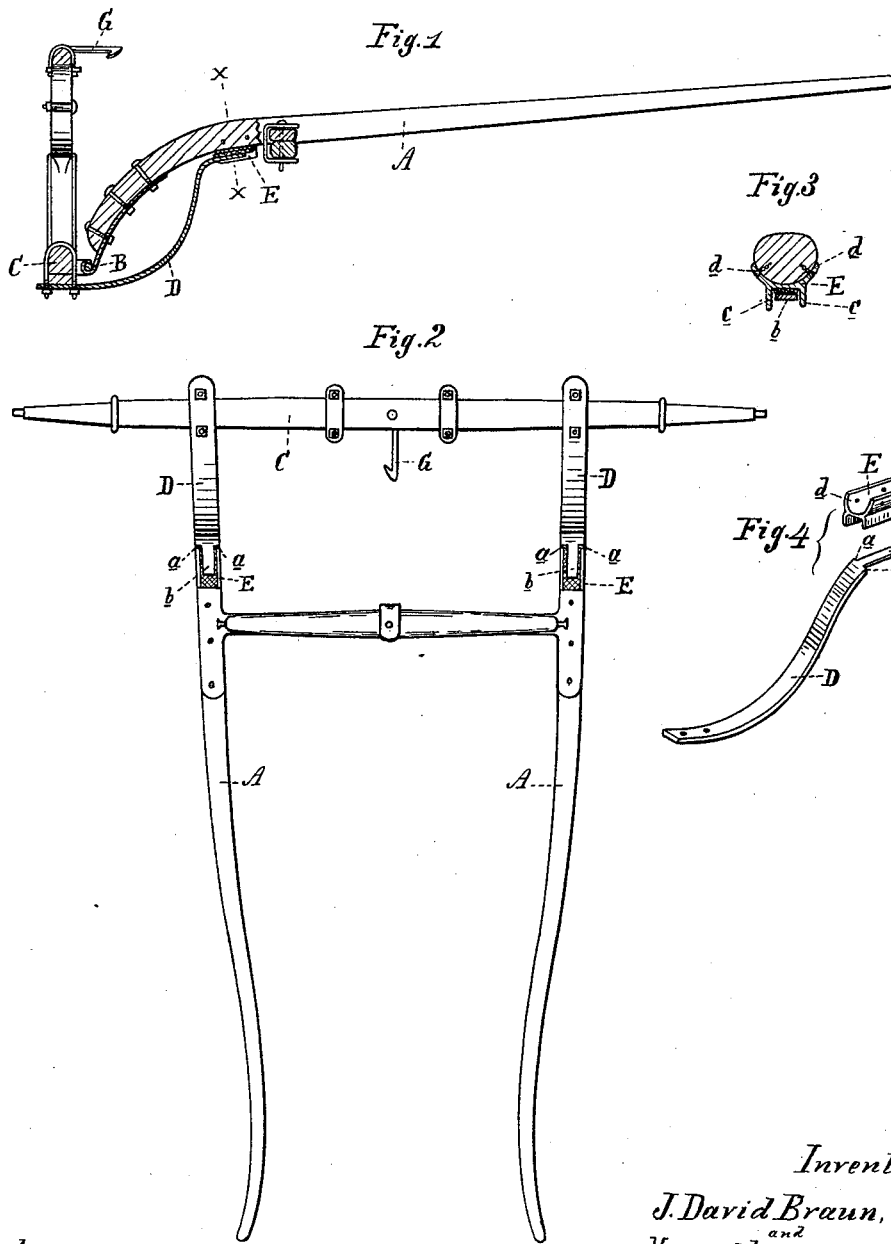
Attest:
John Schuman.
P. M. Hullart.
Inventors:
J. David Braun,
and
Konrad Landschneider.
By Thos. S. Sprague & Son.
Att'y

UNITED STATES PATENT OFFICE.

J. DAVID BRAUN AND KONRAD LANDSCHNEIDER, OF DETROIT, MICHIGAN.

SHAFT-SUPPORT FOR VEHICLES.

SPECIFICATION forming part of Letters Patent No. 391,112, dated October 16, 1888.

Application filed June 4, 1888. Serial No. 276,035. (No model.)

*To all whom it may concern:*

Be it known that we, J. DAVID BRAUN and KONRAD LANDSCHNEIDER, citizens of the United States, residing at Detroit, in the county of Wayne and State of Michigan, have invented certain new and useful Improvements in Thill or Shaft Supports for Vehicles, of which the following is a specification, reference being had therein to the accompanying drawings.

This invention relates to new and useful improvements in shaft or pole supports for vehicles, and the invention is especially designed to apply to that class of shafts or poles which are curved downwardly at their rear end, to be attached to the front axle of the vehicle.

The invention consists in the peculiar construction and arrangement of a spring or springs attached at one end to the front axle of the vehicle, and supporting with its free end the shafts or pole near their rear ends, all as more fully hereinafter described, and shown in the drawings, in which—

Figure 1 is a vertical central cross-section through the front axle and shaft of a vehicle to which our device is applied. Fig. 2 is a bottom plan view of the device shown in Fig. 1. Fig. 3 is a cross-section on line $xx$ in Fig. 1; and Fig. 4 is a detached perspective view of the spring and its keeper.

A represents the ordinary shafts of a vehicle, curved downwardly at their rear ends and secured by any ordinary shaft-coupling, B, to the front axle, C, of the vehicle.

D is a spring secured at its rear end to the under side of the front axle, preferably by means of the clip of the shaft-coupling, and the front end of this spring is extended forwardly and upwardly to the under side of the shaft, where it is provided with a shoulder or shoulders, $a$, beyond which the tongue $b$ extends horizontally forward.

E is a keeper secured to the under side of the shaft in such relative position to the tongue $b$ of the spring as to form a bearing therefor on the under side of the shaft. This keeper E is preferably provided with the downwardly-projecting flanges $c$, which are a sufficient distance apart to admit the tongue $b$ to enter freely between them, but prevent any lateral displacement of the free end of the spring, and at the same time permit the disengagement of the tongue from the keeper when the shafts are lifted. The keeper is also preferably provided with the upwardly-projecting flanges $d$, by means of which it may be secured to the under side of the shaft by suitable screws or rivets or bolts.

The springs D are made of sufficient length to bear with their upper ends against the rear end of the straight portion of the shaft, or nearly so, and the keeper E is secured in such relative position thereto as to form a stop for the shoulders $a$ of the spring to rest against when the draft is applied, so that the weight of the shafts bears against the shoulders $a$ of the spring to produce compression instead of deflection of the spring. By this means a spring of comparatively small dimensions will uphold the weight of the shafts or pole without strain.

Both shafts are preferably provided with a spring, so that the weight of the shafts is evenly supported upon both sides.

In practice, the parts being constructed and arranged as shown and described, the springs D are made of sufficient stiffness to support the whole weight of the shaft in the described manner, to the great comfort of the horses. Thus, when the horse is fully harnessed and the shafts or pole in their regular position for draft, the weight of such shafts or pole is entirely taken off the back of the horse and supported by the spring. The advantage of this arrangement to the owner of the horse and to the comfort of the animal is so obvious that it need not be enlarged upon. Especially is this construction advantageous where the horse stands harnessed to the vehicle for long periods.

The object of constructing the keeper E open on the bottom is to gain freedom in uplifting the shafts, as is the usual practice in storing the vehicles; and for this purpose we permanently attach to the front gear of the vehicle, to any suitable portion, a fixed hook, G, which when the shafts are lifted up may be engaged with the hammer-strap or a suitable catch formed thereon to hold the shafts in their uplifted position.

To preserve the benefit of the springs to the greatest extent while the draft is applied, we preferably transfer the evener from the top of the cross-bar, upon which it is ordinarily carried, to the under side of the cross-bar, so as to bring the draft as low as possible to get less downward strain upon the shafts. Then whatever additional strain is brought upon the spring while the draft is applied may be more successfully resisted by the impingement of the shoulders *a* against the rear end of the keepers.

Another advantage of our construction is that it will be of benefit in harnessing up horses that are unruly or awkward in entering between the shafts, as with our construction the shafts are always upheld and the horses may more readily be guided between the shafts without danger of stepping upon them with the liability of breakage.

Our invention is as applicable to poles of vehicles of the description specified as to shafts, and in its use with poles two springs may be superimposed.

To prevent any rattling noise by the engagement of the spring into the keeper, we preferably line the keeper with leather or other noise-deterring material.

It is obviously included within the spirit of our invention to construct such shaft or pole support with the upper end secured to the shafts or pole and the lower end sliding within a keeper.

What we claim as our invention is—

1. In a shaft or pole support for vehicles, the combination of the curved spring D, secured at its rear end to the axle and bearing with its free end against the under side of the shaft, the shoulders *a* and tongue *b*, formed on the free end of the spring, and the keeper secured to the under side of the shaft and provided with the downwardly-projecting flanges *c*, substantially as described.

2. In a shaft or pole support for vehicles, the combination of the curved spring D, secured at its rear end to the front axle and bearing with its free end against the under side of the shaft, the shoulders *a* and tongue *b*, formed at the forward end of the spring, the keeper E, secured to the under side of the shaft and provided with the downwardly-projecting flanges *c*, engaging with the tongue *b* and forming a stop for the shoulders of the spring, and the evener secured to the under side of the cross-bar, substantially as and for the purpose described.

In testimony whereof we affix our signatures, in presence of two witnesses, this 18th day of May, 1888.

J. DAVID BRAUN.
KONRAD LANDSCHNEIDER.

Witnesses:
JOHN SCHUMAN,
P. M. HULBERT.